United States Patent [19]

Bone et al.

[11] Patent Number: 4,491,110
[45] Date of Patent: Jan. 1, 1985

[54] INTERNAL COMBUSTION ENGINE COMBUSTION CHAMBER PRESSURE SENSING APPARATUS

[75] Inventors: Rainer Bone; Bernward Böning, both of Vaihingen; Rudolf Nagel, Asperg; Franz Sellmaier, Egling, all of Fed. Rep. of Germany

[73] Assignee: Robert Bosch GmbH, Stuttgart, Fed. Rep. of Germany

[21] Appl. No.: 530,482

[22] Filed: Sep. 9, 1983

[30] Foreign Application Priority Data

Sep. 18, 1982 [DE] Fed. Rep. of Germany ....... 3234629

[51] Int. Cl.$^3$ ............................................. F02P 17/00
[52] U.S. Cl. .................................. 123/425; 123/594; 73/35; 73/115
[58] Field of Search ....................... 123/425, 594, 620; 73/35, 115

[56] References Cited

U.S. PATENT DOCUMENTS

| | | | |
|---|---|---|---|
| 3,035,224 | 5/1962 | Whaley et al. | 73/35 |
| 4,232,545 | 11/1980 | Dobler et al. | 73/35 |
| 4,233,943 | 11/1980 | Rogora et al. | 123/425 |
| 4,359,893 | 11/1982 | Kizler et al. | 73/115 |

*Primary Examiner*—Andrew M. Dolinar
*Attorney, Agent, or Firm*—Frishauf, Holtz, Woodward & Goodman

[57] ABSTRACT

To obtain higher current yield from ion current measurable across the electrodes of a spark plug upon application of a biasing potential thereto, occurring immediately after an ignition event due to ionization of burning hydrocarbons within the combustion chamber of an internal combustion engine (ICE), the polarity of the circuit including a spark plug is so selected that the smaller one of the electrodes, typically the center electrode of the spark plug, has a positive measuring voltage and positive ignition voltage applied thereto so that the positively charged ions, which have a substantially greater mass than the electrons, will be caused to flow to the negatively charged substantially greater electrode, thus resulting in an enhanced ion current. A standard automotive ignition circuit can be used, with the battery connected, as customary, with negative-ground (FIG. 3) by reversely connecting the secondary of the ignition coils—with respect to customary connection—to the center electrode of the spark plug. An auxiliary biasing battery can be avoided by charging a capacitor, for example from the ignition system, to provide measuring energy.

5 Claims, 3 Drawing Figures

INTERNAL COMBUSTION ENGINE COMBUSTION CHAMBER PRESSURE SENSING APPARATUS

The present invention relates to apparatus to sense changes in pressure variations within the combustion chamber of an internal combustion engine, and more particularly to apparatus of this type sensing ion current flow to the electrode elements of the spark plug immediately after the spark plug has emitted its spark.

BACKGROUND

It is known to sense pressure changes, and pressure variations within the combustion chamber of an internal combustion engine (ICE) by utilizing an ion current sensor. Operation of the ion current sensor is based on the generation of electrically charged molecules and atoms, that is, ions, as well as free electrons, when hydrocarbons are burned. If a sensing element having two electrodes is positioned within the combustion chamber, and a biasing or measuring voltage is connected across the electrodes, an ion current will flow which depends on the ion concentration. This ion concentration, in turn, changes with pressure in the combustion chamber. The ion current is sensed and will be representative of the combustion event occurring within the combustion chamber.

It has previously been proposed to utilize an ion current signal to recognize knocking operation of an ICE. Such an apparatus is described, for example, in German patent disclosure document DE-OS No. 28 02 202, in which a spark plug is used simultaneously as the ion sensor, to sense pressure variation within the combustion chamber of an ICE. The spark plug, thus, serves simultaneously as the sparking element as well as the ion current sensor, or electrode structure. The spark plug is connected to the ignition circuit in standard, routine manner. The spark voltage applied to the spark plug is substantially higher than the measuring voltage supplied to sense the ion current. The measuring circuit and the ignition circuit are decoupled. In the known structure, a diode, or a high resistance resistor is located within the measuring circuit in order to suppress the effect of the high ignition voltage on the measuring circuit. The system as described operates with ignition systems customary in ICEs, that is, the ignition voltage is negative. Consequently, the ion current measuring circuit has to apply a negative voltage. If this polarity is used in the customary electrode arrangement in spark plugs, the signal in the ion current sensor will be low, so that signal variations, for example representative of knocking of the engine, cannot be reliably recognized under all operation conditions.

THE INVENTION

It is an object to improve circuits of this kind to obtain a substantially higher signal level in an ion current measuring circuit so that the thus obtained signals can be reliably and unambiguously interpreted for reliable recognition of knocking, or incipient knocking of the engine; additionally, the circuit should be capable of being adapted to existing and standard ignition circuits, customary in automative-type ICEs.

Briefly, and in order to obtain the higher signal yield from the ion current, the ignition circuit and the ion current measuring circuit are so arranged that the smaller electrode of the spark plug, typically the central electrode, receives a positive ignition or measuring voltage, respectively. No substantial change in the ignition circuit of a vehicle is needed, only a re-connection of the terminals of the ignition coil with respect to the spark distributor, and re-polarization of the supply voltage for the measuring circuit.

The change in polarity has the entirely unexpected advantage of obtaining substantially better signal yield.

DRAWINGS

DETAILED DESCRIPTION

Electrically charged particles, that is, ions and free electrons occur upon combustion of a fuel-air mixture in the combustion chamber of an ICE. The number of the positive and negative free charge carriers is equal. The quiescent mass of a free electron is approximately 30,000 times less than the mass of the positive ions $H_3O^+$, which ions are present in such combustion processes in large quantities. As can be seen, the negative charge carriers are substantially lighter. About 99% of the negative charge carriers are free electrons. Consequently, the negative charge carriers which occur in substantial numbers during a combustion process are substantially lighter than the positive charge carriers which occur during the same combustion process.

It is possible to use a standard spark plug as an ion current sensor for the ions in the combustion chamber of an IC engine. Such a standard spark plug usually has a center electrode which is substantially smaller than the ground, or chassis electrode. If the polarity which is customary in spark or ignition systems is selected, that is, a negative ignition, and hence ion measuring voltage, then the smaller center electrode will be negatively charged and the substantially larger ground or chassis electrode is positively charged. In accordance with the concept of the present invention, the polarities as customarily used, and the size relationships of the electrodes on the spark plug do not correspond to the relationships of weights of the charged carriers which occur upon a combustion event in the ICE.

In accordance with the present invention, the electrode configuration is so selected, or the polarity is so selected, that the smaller electrode is positively charged, and the larger electrode is negatively charged.

In accordance with the present invention, the negative charge carriers thus, with the same absolute value of charge in the electrical field, will be accelerated much more and thus are readily capable of passing through a larger path length, per unit of time than the positive ions. By arranging the electrode configuration, or polarity of the electrodes, respectively, in accordance with the invention, as many negative charge carriers, per unit of time, will reach the electrode with the small surface than positive ions reaching the electrodes with the larger surface. Consequently, and in accordance with the present invention, a substantially higher ion current, and thus a substantially higher signal yield is obtained.

Figure 1:
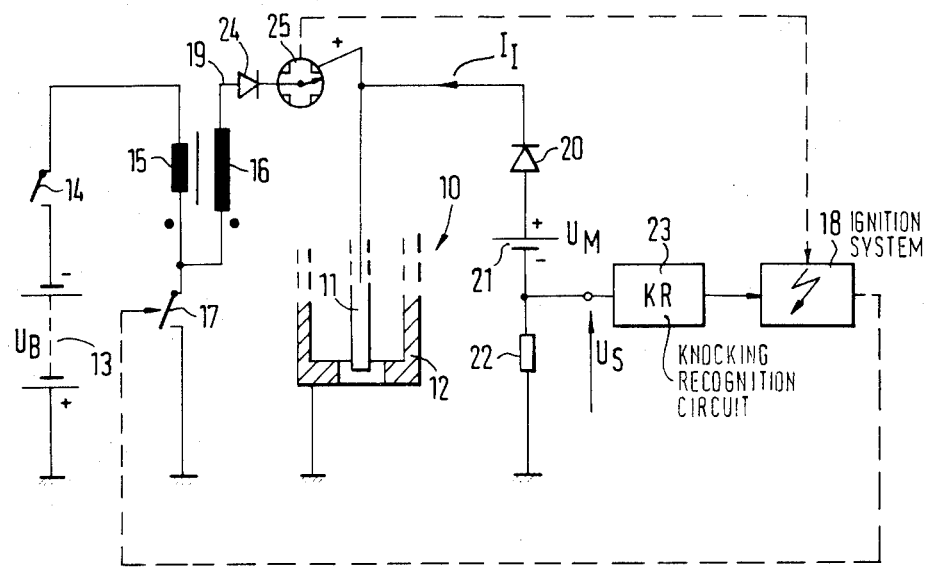
FIG. 1 is a general circuit diagram of an ignition system in which an ignition and measuring circuit are arranged in accordance with the present invention.

The circuit of FIG. 1 illustrates a standard ignition circuit modified in accordance with the concept of the present invention. The spark plug 10 has a small center electrode 11 and a substantially larger ground, or chassis, or counter electrode 12. As seen, electrode 12 is connected electrically to the ground or chassis, typically by being screwed into the cylinder head of an ICE (not shown in detail). The vehicle battery 13 supplies a voltage $U_B$; in accordance with a feature of the invention, the battery 13 is connected with "ground positive", i.e. its negative terminal is connected to the ignition switch 14 and hence to the "live" bus of the electrical system, and to the primary 15 of an ignition coil. The remote end of the primary winding 15 is connected to a breaker or interrupter circuit 17, which may be a transistor, or breaker switch or other suitable circuit, and then to chassis. The breaker or interrupter switch 17 is controlled in any suitable and well-known manner by an ignition system 18. One of the terminals of ignition coil 16 is connected to the junction between the primary 15 and the interrupter 17. The other terminal of the secondary 16 will have a positive voltage available on an ignition line 19 which is connected through a diode 24 to a distributor 25 which is connected, in well-known manner, to the central electrode 11 of the spark plug 10. The measuring circuit is likewise connected to the centering electrode 11 and includes the series circuit of a diode 20, a measuring voltage supply source 21 which, for example, is shown as a battery and a measuring resistor 22. The measuring source voltage 21 provides a measuring voltage $U_M$ which is so polarized that its positive terminal is connected to the sensor electrode 11, by being connected to the anode of the diode 20. A measuring for signal voltage $V_S$ will appear across the measuring resistor 22, the measuring voltage $U_s$ being connected to a knocking sensor recognition circuit 23 which may be of any well-known and suitable configuration. The knocking sensor recognition system 23 is connected to the ignition system 18 to control the ignition instant, for example spark advance or retardation.

Figure 2:
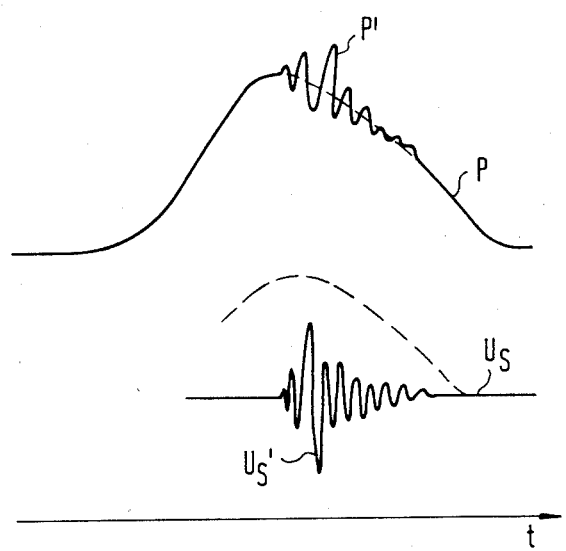
FIG. 2 is a pressure, and signal graph, respectively, with respect to time upon occurrence of an ignition event, and consequent explosion of fuel-air mixture in the combustion chamber of an ICE.

The ignition system formed of elements 13-18, 24, 25 supplies ignition energy to the spark plug 10 for causing ignition events, as well known and as standard for automotive-type ignition circuits. In contrast to the usual, and standard connection, however, the ignition voltage is positive with respect to ground or chassis. Under such conditions, and under normal combustion, the time-sequence of the pressure p within the combustion chamber will be as shown in the broken line curve of FIG. 2. This pressure variation will occur just shortly after ignition. Ion current measurement must, of course, be carried out after the ignition spark in order to sense the essential course of the pressure changes due to the explosion within the combustion chamber of the ICE. Consequently, the measuring voltage $U_M$ is applied to the electrodes 11, 12 and causes flow of an ion current $I_f$. Current flowing through the measuring resistor 22 will cause the signal voltage $U_s$, which is shown in broken lines in FIG. 2, lower graph. The diode 22 de-couples the measuring circuit from the ignition circuit since it blocks the voltages occurring at the end of the closing period and at the end of the opening period of the breaker contact or switch 17, so that continuous measurement is possible.

Let it be assumed that combustion, however, rather than being normal will or may result in knocking of the engine. The pressure variation, with respect to time, is then shown in FIG. 2 in the solid line curve p'. Similar to the pressure variations, the ion current will likewise oscillate, see measuring voltage $U_s'$, lower solid line graph of FIG. 2. This deviation from the non-undulating or oscillating normal ion current—$U_s$, broken line—is analyzed in the knocking recognition circuit 23, for example by filtering, in accordance with well known and suitable analysis criteria.

The selection of the polarity in accordance with the present invention causes the negative charge carriers to flow to the positively charged, smaller center electrode 11, and the substantially heavier positively charged carrier to flow to the much larger chassis electrode, also usually physically closer to the combustion event itself, so that the signal voltage $U_s$ and $U_s'$, respectively, available to the knocking recognition circuit will be substantially larger than with standard polarity.

In this arrangement it is possible to replace the de-coupling diode 20 by a high resistance resistor, as well known in the known technology. This, however, will limit the ion current $I_f$. Only the ohmic range of the ion current density will be sensed. The current density depends only on the field strength, that is, on the quotient of voltage and electrode distance. To measure the ion density—which is the parameter of interest to determine knocking—it is also necessary to reachthe non-ohmic range, which requires substantially higher current densities. Consequently, it is preferred to use a diode 20 rather than the high resistance resistor. The diode 20 de-couples the measuring network from the ignition circuit without, however, limiting the ion current which can be sensed by being dropped across resistor 22.

Figure 3:
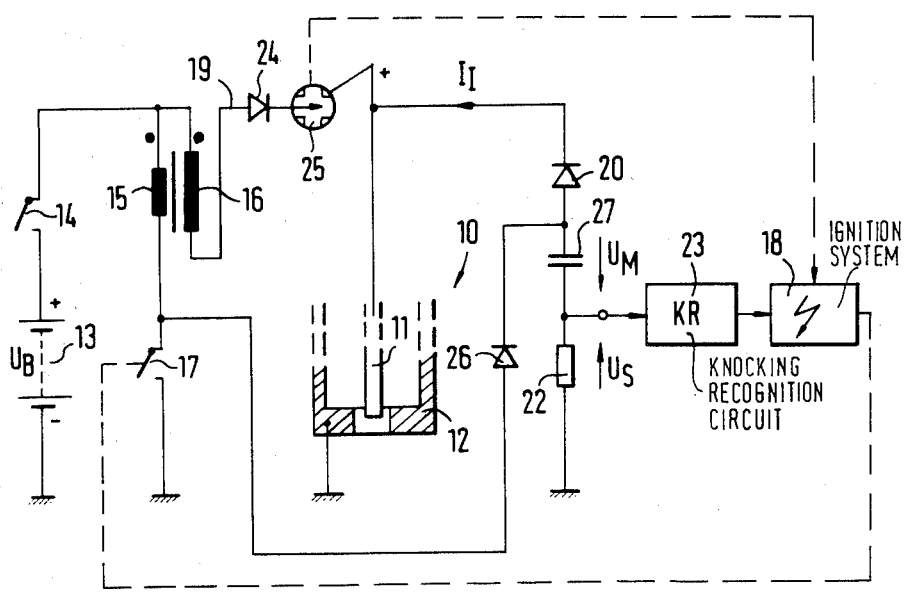
FIG. 3 is a general circuit diagram of another embodiment of the system of the present invention.

Embodiment of FIG. 3: The system of FIG. 3 utilizes the same elements previously discussed but is suitable for connection to an automotive electrical system with standard polarity of the main battery 13. The same elements have been given the same reference numerals and will not be described again. In contrast to the embodiment of FIG. 1, the battery 13, as is customary, has its negative terminal grounded, or connected to chassis. The positive ignition voltage at the center electrode 11 is then obtained by reversely connecting, or re-polarizing the secondary of the ignition coil 16 with respect to standard and normal arrangements, as illustrated. FIG. 3 illustrates also another modification. The separate battery 21 of FIG. 1 to obtain the measuring voltage $U_M$ has been replaced by a capacitor 27 which is charged over a diode 26 directly from the primary side of the ignition coil. Thus, modification of a standard ignition circuit utilized in most automotive-type internal combustion engines is simplified and the customary polarity relationships—except for the ignition coil—can be retained.

Various changes and modifications may be made and features described in connection with any one of the embodiments and may be used with the others, within the scope of the inventive concept.

In an operative example, and referring to FIG. 3, for use with a 12 V automotive system, the ignition coil 15, 16 was of the type: a common ignition coil can be used except that the secondary was reversely connected as shown in FIG. 3.

Diode 24: for example: HS3 or HS6 (AEG)
Diode 20: for example: TV16SI (AEG) or S 5546 (Toshiba)
Diode 26: for example: 1N4005
Capacitor 27: for example: 0,1 μF, 630 V Resistor 22: about 10 kΩ, depends on the ignition coil, spark plug, etc.

A suitable knocking recognition circuit is described in: a common knocking recognition circuit can be used.

A suitable ignition system in which spark timing is controlled by a knocking recognition circuit is described in: a common ignition system can be used.

We claim:

1. In combination with an internal combustion engine (ICE) having a spark ignition circuit (13–16, 18, 19; 24, 25);

a spark plug (10) protruding into the combustion chamber of a cylinder of the engine, wherein the spark plug has a center electrode (11) and a ground or chassis electrode (12) differing in size from the center electrode;

means for sensing pressure variations in the combustion chamber upon occurrence of a combustion event including an ion current sensing network (23);

means (21, 27) for applying a measuring voltage $U_M$ across the electrodes of the spark plug;

connection means (20) for decoupling the sensing network from the ignition circuit of the spark plug, the ion current sensing network sensing the ion current ($I_I$) after firing of the spark plug due to the measuring voltage applied to the electrodes (11, 12) wherein, in accordance with the invention the ignition circuit and the measuring voltage applying means apply the ignition voltage, and measuring voltage, respectively, with positive polarity to that one of the electrodes (11) which is the smaller one of the electrodes (11, 12).

2. Combustion pressure sensing means according to claim 1 wherein the means for applying the measuring voltage ($U_M$) comprises a battery (21) coupled for connection across the electrode.

3. Combustion pressure sensing means according to claim 1 wherein the means for applying the measuring voltage ($U_M$) comprises a capacitor (27) and a diode (26) connected to the ignition circuit and charging the capacitor, the capacitor being coupled for connection across the electrodes.

4. Combustion pressure sensing means according to claim 1 further including a main battery (13) having its negative terminal connected to the ground, or chassis electrode of the spark plug (10);

the ignition circuit includes an ignition coil having a primary winding connected to the positive terminal of the battery, and a secondary winding, the primary and secondary windings (15, 16) are wound in the same winding direction;

and wherein the center electrode of the spark plug (10) is connected to the secondary winding (16) at a terminal opposite that one of the secondary winding terminals which is adjacent the terminal of the primary winding connected to the positive terminal of the battery (13).

5. Combustion pressure sensing means according to claim 4 wherein the means for applying the measuring voltage ($U_M$) comprises a capacitor (27) and a diode (26) connected to the ignition circuit and charging the capacitor, the capacitor being coupled for connection across the electrodes.

* * * * *